(12) United States Patent
Rolf et al.

(10) Patent No.: US 11,362,833 B2
(45) Date of Patent: Jun. 14, 2022

(54) METHOD, APPARATUS, AND SYSTEM FOR EMBEDDING INFORMATION INTO PROBE DATA

(71) Applicant: HERE GLOBAL B.V., Eindhoven (NL)

(72) Inventors: Daniel Rolf, Berlin (DE); Raul Cajias, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 277 days.

(21) Appl. No.: 16/588,314

(22) Filed: Sep. 30, 2019

(65) Prior Publication Data

US 2021/0099307 A1    Apr. 1, 2021

(51) Int. Cl.
| H04L 29/06 | (2006.01) |
| H04L 9/32 | (2006.01) |
| H04L 9/06 | (2006.01) |
| G06F 16/29 | (2019.01) |
| G06F 7/58 | (2006.01) |
| G06F 7/499 | (2006.01) |
| H04L 9/08 | (2006.01) |

(52) U.S. Cl.
CPC ........ *H04L 9/3242* (2013.01); *G06F 7/49942* (2013.01); *G06F 7/58* (2013.01); *G06F 16/29* (2019.01); *H04L 9/0643* (2013.01); *H04L 9/0819* (2013.01)

(58) Field of Classification Search
None
See application file for complete search history.

(56) References Cited

U.S. PATENT DOCUMENTS

| 9,154,301 | B2 | 10/2015 | Prehofer et al. | |
| 2009/0265781 | A1* | 10/2009 | Prehofer | H04W 4/02 726/22 |
| 2018/0330464 | A1* | 11/2018 | Sharma | G06K 9/6206 |
| 2019/0108695 | A1* | 4/2019 | Slusar | G06F 21/606 |

OTHER PUBLICATIONS

Yue et al., abstract of "Rights Protection for Trajectory Streams", Conference Paper, Apr. 2014, 4 pages.
Feng et al., "Real-time Watermarking Techniques for Sensor Networks", Article in Proceedings of SPIE—The International Society for Optical Engineering 5020(5020), retrieved from http://web.cs.ucla.edu/~miodrag/papers/Feng_SPIE_03.pdf, Nov. 2003, 12 pages.

* cited by examiner

*Primary Examiner* — Andrew J Steinle
(74) *Attorney, Agent, or Firm* — Ditthavong, Steiner & Mlotkowski

(57) ABSTRACT

An approach is provided for embedding information into probe data. The approach involves retrieving a probe data set comprising a plurality of probe data points collected from a probe device. The approach also involves determining the information to embed, wherein the information is a bit string of a specified length. The approach further involves iteratively selecting at least one bit of the bit string to embed into at least one probe data point of the plurality of probe data points to generate an embedded probe data set until at least a predetermined portion of the bit string is embedded. The approach further involves providing the embedded probe data set as an output.

20 Claims, 17 Drawing Sheets

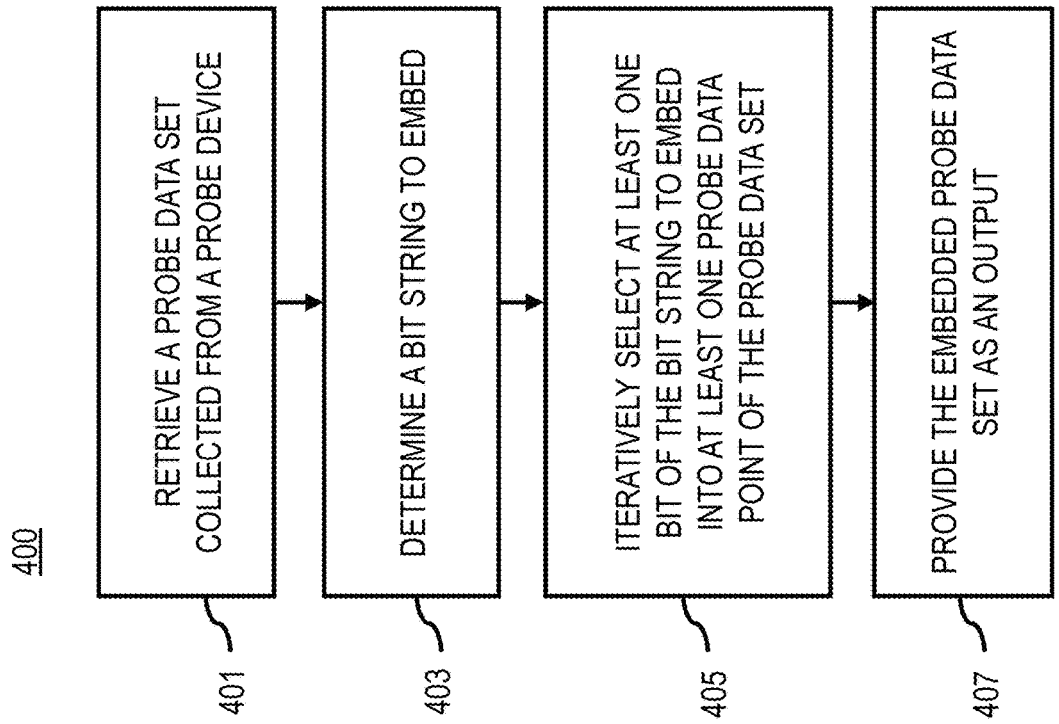

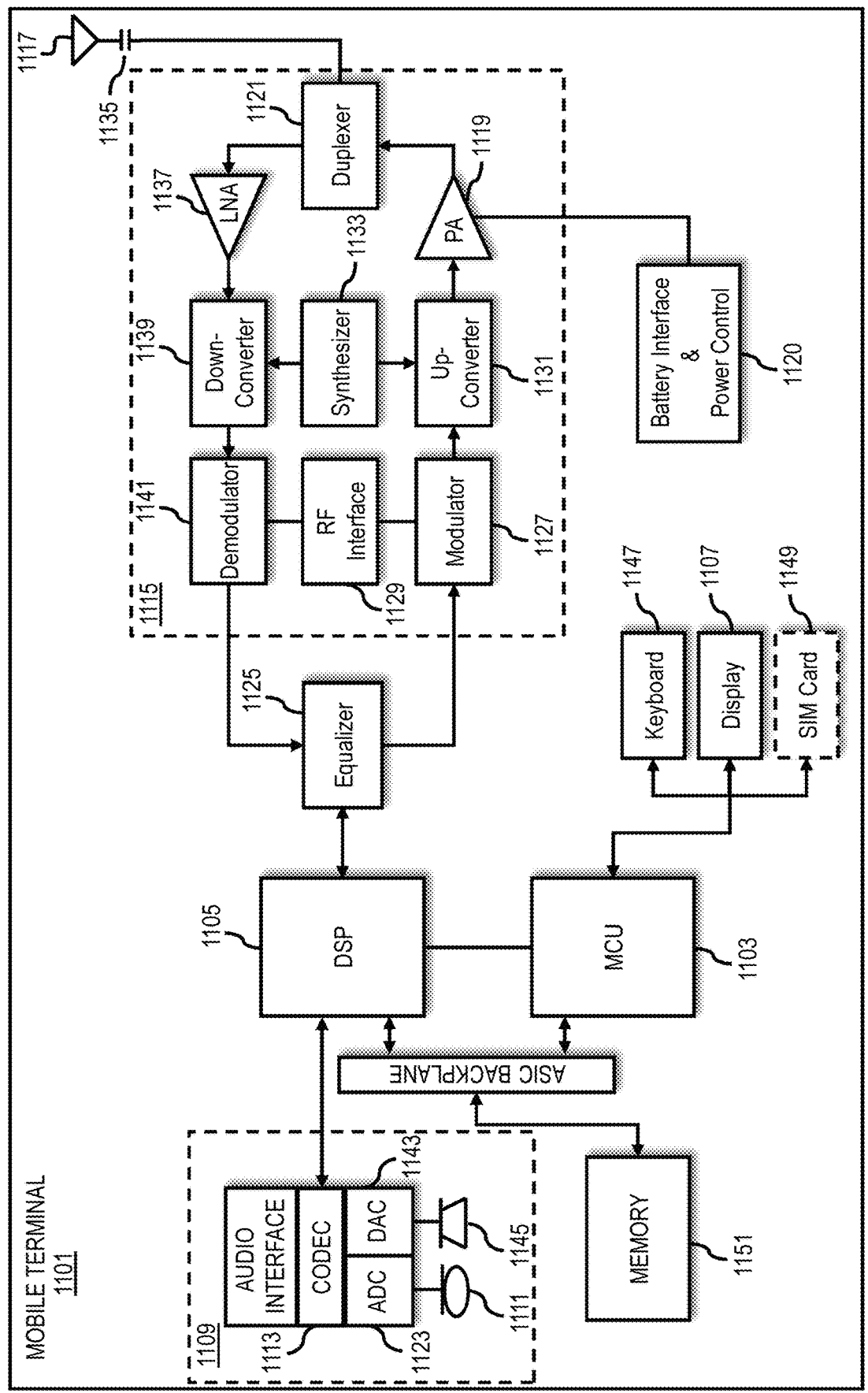

METHOD, APPARATUS, AND SYSTEM FOR EMBEDDING INFORMATION INTO PROBE DATA

BACKGROUND

Vehicle probe data is widely used to monitor traffic flow and to provide speed and travel-time information for navigation services, mobile workforce management systems, autonomous driving systems, traffic management systems, location-based services, etc. As the numbers of applications and commercial values of probe data increase, it becomes important for probe data providers and/or vendors, such as public entities operating fixed-sensor networks, cellphone carriers, etc., to trace and prevent unauthorized redistribution of probe data.

SOME EXAMPLE EMBODIMENTS

Therefore, there is a need for embedding a watermark and/or any other information into probe data for data protection, data-leak tracing, and/or any other application where the information is to be associated with the probe data or any other type of data stream into which the information is to be embedded.

According to one embodiment, a computer-implemented method for embedding information (e.g., a watermark) into probe data comprises retrieving a probe data set comprising a plurality of probe data points collected from a probe device. The method also comprises determining the information to embed, wherein the information is a bit string of a specified length. The method also comprises iteratively selecting at least one bit of the bit string to embed into at least one probe data point of the plurality of probe data points to generate an embedded probe data set until at least a predetermined portion of the bit string is embedded. The method further comprises providing the embedded probe data set as an output.

According to another embodiment, an apparatus for embedding information into probe data comprises at least one processor, and at least one memory including computer program code for one or more computer programs, the at least one memory and the computer program code configured to, with the at least one processor, cause, at least in part, the apparatus to retrieve a probe data set comprising a plurality of probe data points collected from a probe device. The apparatus is also caused to determine the information to embed, wherein the information is a bit string of a specified length. The apparatus is further caused to iteratively select at least one bit of the bit string to embed into at least one probe data point of the plurality of probe data points to generate an embedded probe data set until at least a predetermined portion of the bit string is embedded. The apparatus is further caused to provide the embedded probe data set as an output.

According to another embodiment, a non-transitory computer-readable storage medium for embedding information into probe data carrying one or more sequences of one or more instructions which, when executed by one or more processors, cause, at least in part, an apparatus to retrieve a probe data set comprising a plurality of probe data points collected from a probe device. The apparatus is also caused to determine the information to embed, wherein the information is a bit string of a specified length. The apparatus is further caused to iteratively select at least one bit of the bit string to embed into at least one probe data point of the plurality of probe data points to generate an embedded probe data set until at least a predetermined portion of the bit string is embedded. The apparatus is further caused to provide the embedded probe data set as an output.

According to another embodiment, an apparatus for embedding information into probe data comprises means for retrieving a probe data set comprising a plurality of probe data points collected from a probe device. The apparatus also comprises means for determining the information to embed, wherein the information is a bit string of a specified length. The apparatus further comprises means for iteratively selecting at least one bit of the bit string to embed into at least one probe data point of the plurality of probe data points to generate an embedded probe data set until at least a predetermined portion of the bit string is embedded. The apparatus further comprises means for providing the embedded probe data set as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart of a process for embedding information into one probe data set originated from one probe device, according to one embodiment;

FIG. 11 is a diagram of a mobile terminal (e.g., handset or vehicle or part thereof) that can be used to implement an embodiment.

DESCRIPTION OF SOME EMBODIMENTS

Examples of a method, apparatus, and computer program for embedding information into probe data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
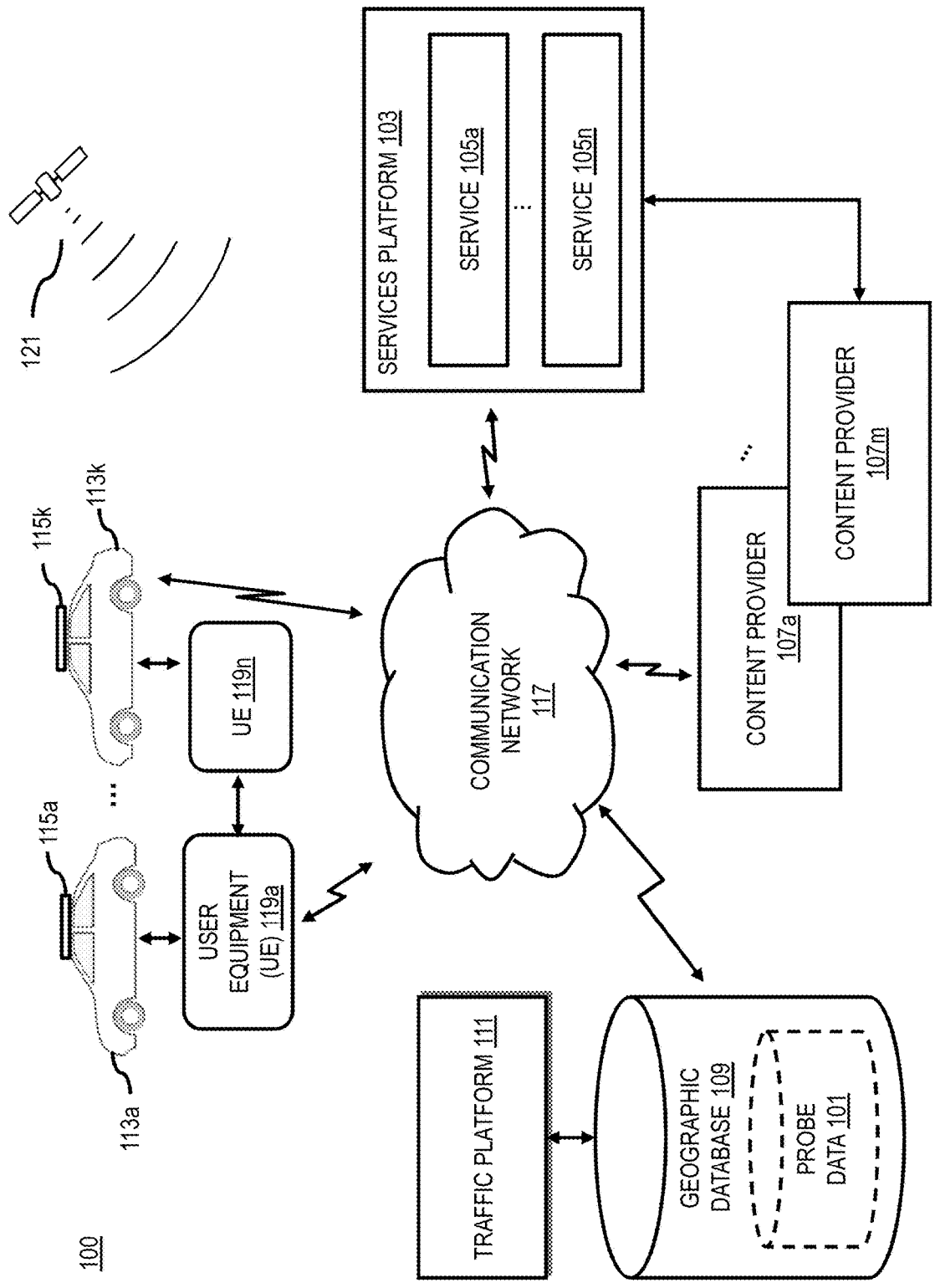
FIG. 1 is a diagram of a system capable of embedding information into probe data, according to one embodiment.

FIG. 1 is a diagram of a system 100 capable of embedding information into probe data, according to one embodiment. Generally, probe data 101 may be published by public entities (e.g., government/municipality agencies, local police, etc. operating fixed-sensor networks), third-party official/semi-official sources (e.g., automated toll-tag system operators), private entities (e.g., cellphone carriers, automated vehicle location service providers, etc.), and/or (e.g., a services platform 103, one or more services 105a-105n (also collectively referred to herein as services 105), one or more content providers 107a-107m (also collectively referred to herein as content providers 107), etc.). Probes can be devices carried by travelers (e.g., user equipment 119) and/or vehicles 113 configured with in-vehicle telematics capable of producing probe data. Each probe relays its location and traveling data, such as location, speed, direction, a respective timestamp, and/or other related data in a data stream in real-time, or at a fixed or variable refresh rate. By way of example, the other data may include a probe type (e.g., a smartphone, an in-vehicle telematics system, etc.), a probe model (e.g., a smartphone model number, vehicle model, etc.), a density, a queue, a turning ratio, a route preference, etc.

In one embodiment, a probe data provider (e.g., via a traffic platform 111, services 105, content provider 107, or equivalent) monitors the feeds of raw probe data from probes and various other sources (e.g., roadside sensors, etc.), extracts and provides probe data 101 and/or other applications/functions based on the probe data 101 (e.g., displays the location of traffic jams and/or closures on a map, generates navigation routes to avoid reported jams/closures, etc.). Generally, sensors from the probes (e.g., cars, drones, phones, etc.) can generate a high volume of probe data (e.g., millions of probe points) that is logged and stored for various use-cases (e.g., real-time traffic monitoring, digital mapping, navigation, etc.). Because of the high volume of data, it can be technically challenging to determine whether a probe data provider or vendor is repackaging or reselling probe data originating from other vendors or even the data consumer. As a result, users of probe data or other equivalent types of data streams face significant technical challenges to detecting when such reuse or copying of probe data is occurring or simply to determine original ownership of the data.

To address this problem, the system 100 introduces a capability to embed information (such as a watermark) into a probe data set that, for instance, is provided from a probe vendor or other probe data source. In one embodiment, the system 100 embeds information or data (e.g., a bit-string) into a data stream (e.g., a probe data set comprising a collection of individual probe data points) by quantizing one or more attributes of the data points of the data stream (e.g., individual latitude and longitude values of the probe data points of a probe data set) into a grid of cells. Each grid of the cell is then associated with respective bits of the of the bit-string such that the value of the corresponding bit is encoded into at least one other attribute (e.g., a speed attribute) of the data point(s) or probe point(s) falling within the corresponding grid cell. For example, the embedding can be performed by modulating the bit value into a least significant digit of speed attribute or any other selected attribute of the probe point. The modulating can include but is not limited to changing the least significant digit to an even value if the bit value is 0 or an odd value if the bit value is 1 (or vice versa). By selecting the least significant digit to embed the bit value, the system 100 can minimize the amount of noise introduced by the embedded information to the corresponding data attribute value. In cases where data noise is not an issue, the system 100 can select any other digit(s) to embed the information. In this way, the bit-string or information (e.g., a watermark or any other information) can be advantageously concealed or embedded across the individual data points of the data stream. In other embodiments, the system 100 can apply error-correction codes to the information to preserve the bit-string. Additionally, the system 100 an optionally apply an encryption layer to further conceal the embedded information from third parties or other unauthorized user.

By way of example, the system 100 can process raw probe data (e.g., collected from dedicated probe devices/vehicles, users of insurance trackers, mobile device applications, navigation systems, etc.) to embed any type of information or data such as but not limited to a watermark. In an embodiment where a watermark is embedded, the system 100 can use the embedded watermark to identify the data's owner (e.g., to track intellectual property and related data leaks). For instance, the owner may be a map data provider. In another instance, the owner may be an insurance provider, a mobile device application provider, a mobile device provider, a navigation system provider, etc. In yet another instance, the owner may be the provider of the system 100.

Figure 2:
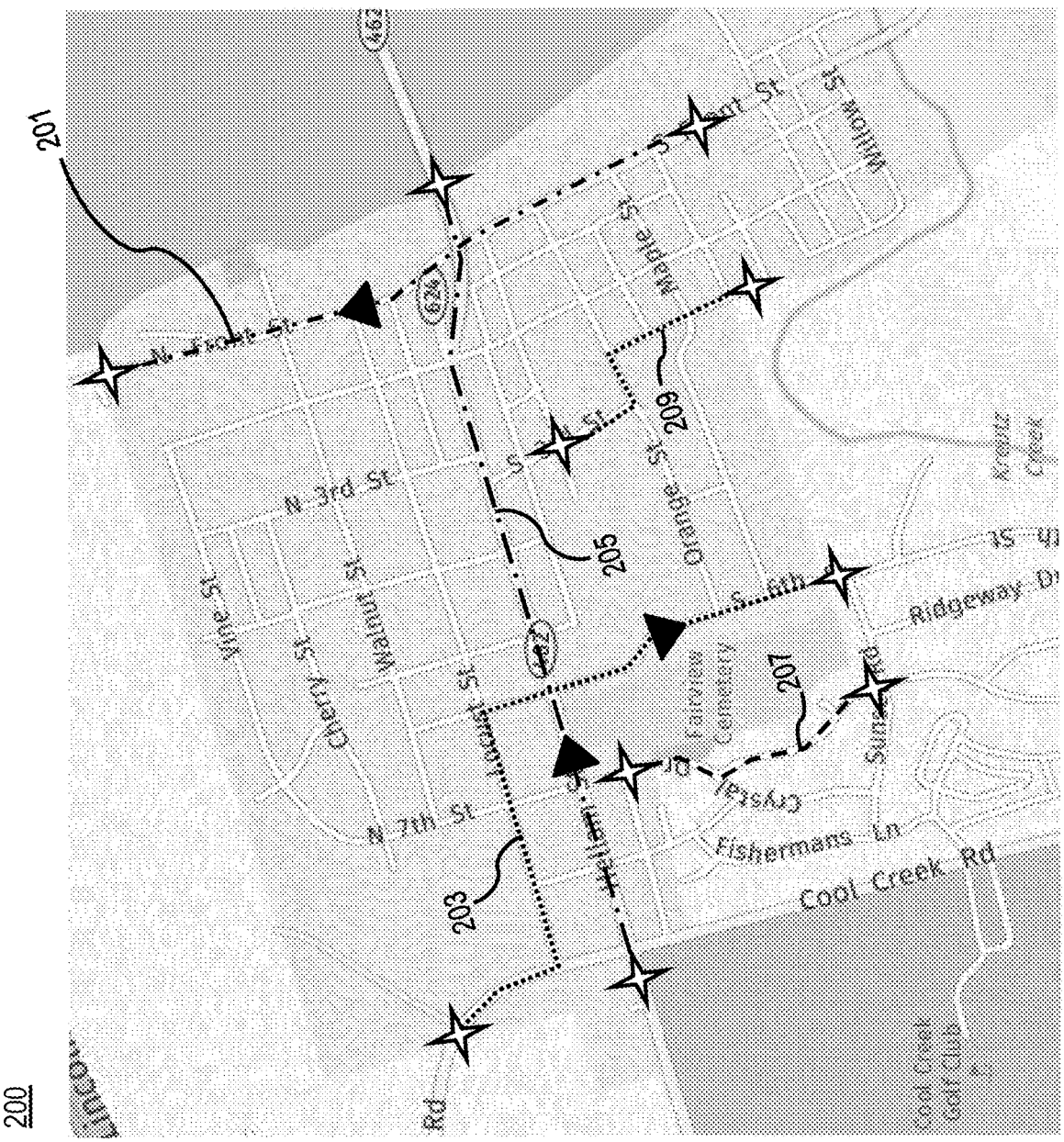
FIG. 2 depicts probe data sets on a road network in a map, according to one embodiment.

FIG. 2 depicts an example probe data set comprising a multiple probe trajectories collected from probes traveling on a road network, according to one embodiment. For example, the system 100 can use a cloud-computing system to partition the road network into one or more data collection areas (or if there is no partitioning, collect data from the entire monitored geographic area). In one instance, the system 100 collects a probe data set that includes all probe trajectories occurring within the monitored area of the map 200 over a period of time (e.g., in the last Δt seconds or some other designated time window). In this instance, the probe data set includes at least probe trajectories 201, 203, 205, 207, and 209. In turn, each probe trajectory 201-209 comprises individual probe data points representing a time-sequence of sample location points (e.g., with attributes such as latitude, longitude, direction, speed, time of sampling, etc.) corresponding to a unique probe (e.g., UE 119 and/or vehicle 113). As more probes (e.g., thousands or more probes) are monitored within the area of the map 200, additional probe trajectories (not shown) generally will cover or traverse over most if not all of the locations or road segments shown in the map 200. Although the various embodiments are described with respect to a probe data set, it is contemplated that the embodiments described herein are applicable to any data stream that includes data points with quantizable attribute values. For example, quantizable values include those attributes whose values can be binned or group into discrete ranges (e.g., a latitude value of 75.6° can be quantized into a discrete range between 75.0° and 80.0°.

In one embodiment, to embed information into probe data, the system 100 determines the information to embed into a probe data set originated from a probe, such as a vehicle, a drone, a smart phone, etc. The information, such as is a digital watermark or signature of the owner of the probe data set 201, is a bit string of a specified length and identifies an ownership of such probe data set.

In one embodiment, the system 100 iteratively selects at least one bit of the bit string to embed into at least one probe data point of the plurality of probe data points of the probe data set 201, to generate an embedded probe data set until at least a predetermined portion of the bit string is embedded. As such, a digital watermark is embedded into a probe data steam without changing the size of the probe data set like an optional data element added to the probe data set. In other words, the system 100 uses an embedding approach that does not change the storage size of the probe data because of the information is embedded within existing attribute values of the probe points of the probe data set. The system 100 provides the embedded probe data set as an output, such as to a probe data library or database to be available for all kinds of probe data applications and/or processing, such as navigation services, mobile workforce management, traffic management, etc.

In another embodiment, an encryption layer is added to conceal the information (e.g., a watermark or signature of the probe data set) from third parties. By way of example, the system 100 initiates an encryption of the information prior to the embedding. The encryption may use a key based on a hash (e.g. SHA1, MD5) computed from an identity of the probe device, a random number, or a combination thereof. The key can be used to prove an ownership of the probe data set.

In yet another embodiment, error-correction-codes are applied to the information (e.g., to the watermark) to preserve the accuracy of the bit-string after transmission. By way of example, the system 100 generates another bit string based on the bit string by applying an error-correction block codec (e.g., one or more redundant bits) to the watermark. The error-correction block codec may be a complex function of many original watermark bits. The original watermark may or may not appear literally in the encoded output. The another bit string (i.e., the encoded output) is embedded into the probe data set in place of the bit string to generate the embedded probe data set. The redundancy allows the receiver to detect a limited number of errors that may occur anywhere in the bit-string, and to correct these errors without re-transmission.

A probe data set may be embedded with one or more different watermarks at the same time. In one instance, a probe data set is embedded with respective watermarks of a chain of owners cascaded in a time sequence. By way of example, a navigation system provider watermark and a system 100 watermark are embedded into one probe data set originated from one probe device.

In another embodiment, the system 100 can embed a bit string into a data stream resulting from processing of the probe data sets, such as a traffic flow data stream, using the above-discussed embedding scheme. In other words, the embodiments of the embedding scheme can apply any other data stream that is derived or calculated from the original probe data set or other underlying data stream that has quantizable attribute values. As used herein an attribute or attribute value refers to any parameter or data field that is collected or used to describe an individual data point. For example, a probe data point generally has one or more of the following attributes: a timestamp indicating a time of measurement, a determined latitude, a determined longitude, a determined direction, and/or a determined speed of travel.

In other embodiments, as discussed above, the system 100 can embed a bit string into any type of data stream (e.g., data streams that are not probe data) using the above-discussed embodiments of the information embedding scheme, as long as the data points in the stream can be quantized into a grid (or an array of any number of dimensions corresponding to the number of attributes that are to quantized). By way of example, such a data stream may be a voice message, returns per minute of a stock, a hourly temperature curve at one location, a daily passenger amount passing via an airport, etc.

In yet other embodiments, the system 100 can embed any bit string or information (e.g., information or bit strings other than a watermark) into a data stream using the above-discussed embodiments of the embedding scheme. By way of example, the system 100 passes a bit string of any information (such as a username, a version number, maintenance need data, SOS signals, keylogging data, etc.), via a channel of communication embodied in the data stream, which is concealable and without additional bandwidth cost.

Figure 3:
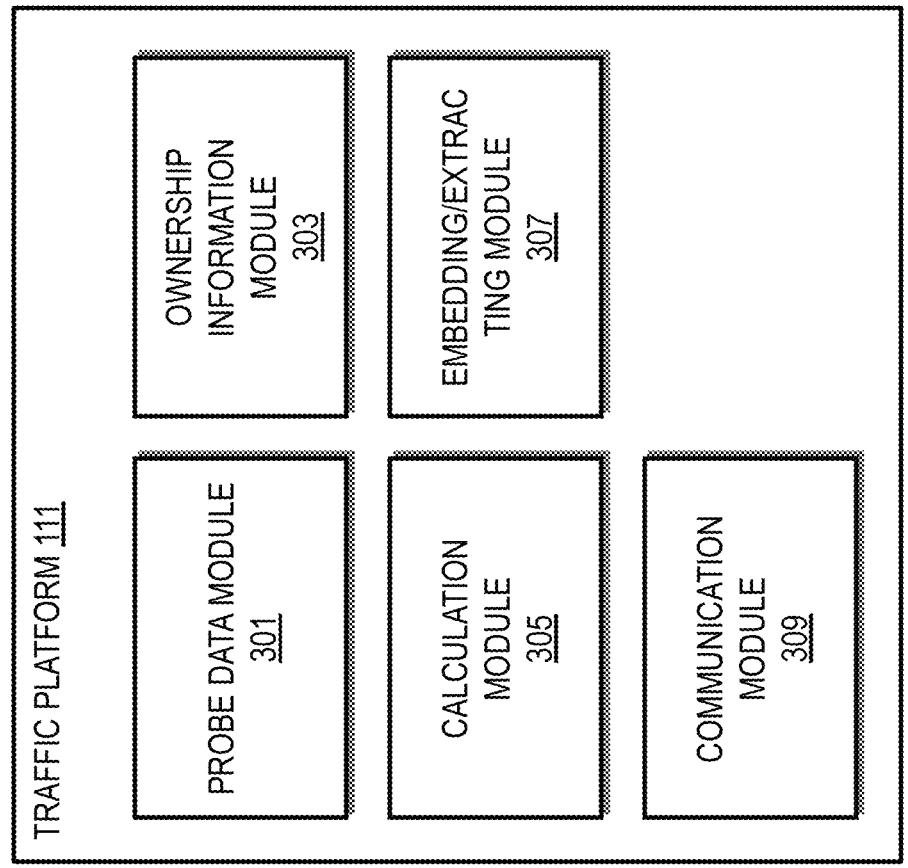
FIG. 3 is a diagram of the components of a traffic platform, according to one embodiment.

FIG. 3 is a diagram of the components of a traffic platform 111, according to one embodiment. By way of example, the traffic platform 111 includes one or more components for embedding information into probe data according to the various embodiments described herein. It is contemplated that the functions of these components may be combined or performed by other components of equivalent functionality. In this embodiment, the traffic platform 111 includes a probe data module 301, an ownership information module 303, a calculation module 305, an embedding/extracting module 307, and a communication module 309. The above presented modules and components of the traffic platform 111 can be implemented in hardware, firmware, software, or a combination thereof. Though depicted as a separate entity in FIG. 1, it is contemplated that the traffic platform 111 may be implemented as a module of any of the components of the system 100 (e.g., a component of one or more vehicles 113a-113k (also collectively referred to herein as vehicles 113), services platform 103, services 105, etc.). In another embodiment, one or more of the modules 301-309 may be implemented as a cloud-based service, local service, native application, or combination thereof. The functions of the traffic platform 111 and modules 301-309 are discussed with respect to FIGS. 4-6 below.

Figure 10:
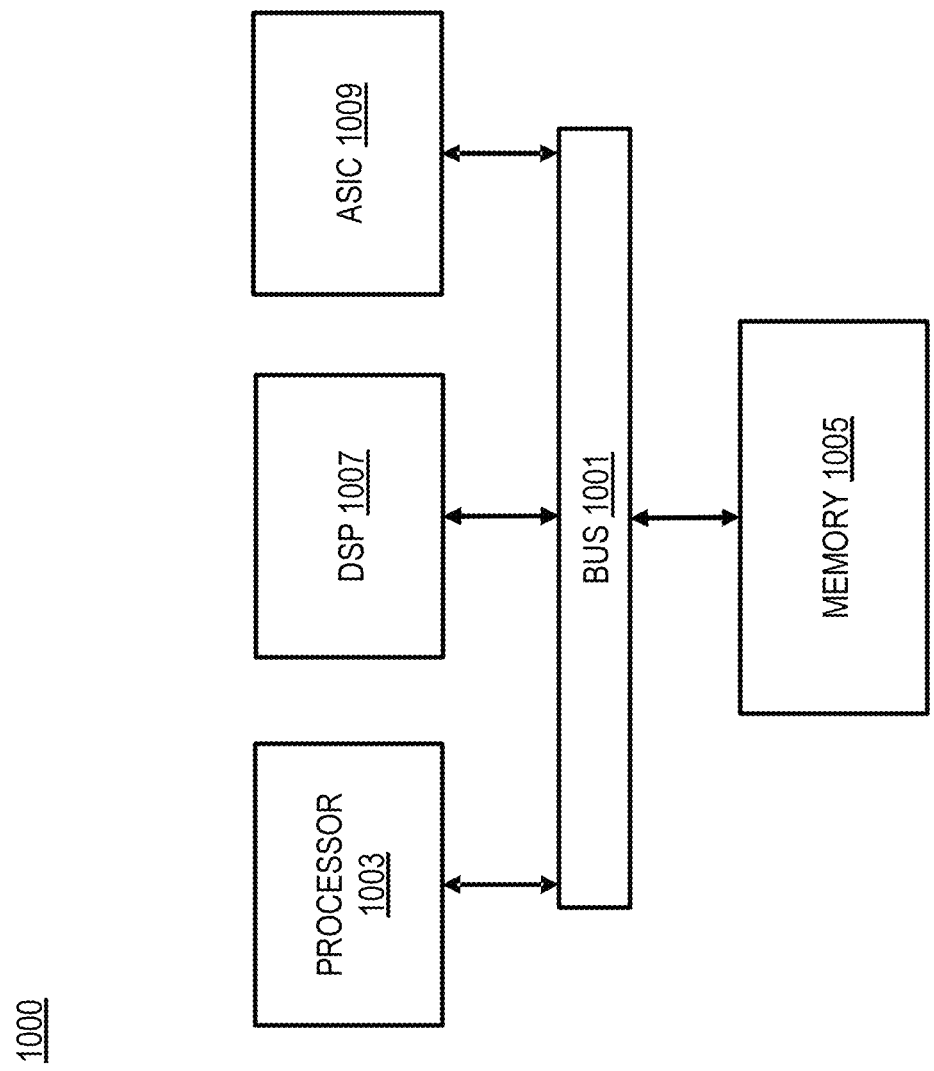
FIG. 10 is a diagram of a chip set that can be used to implement an embodiment.

FIG. 4 is a flowchart of a process for embedding information (such as a watermark) into one probe data set originated from one probe device, according to one embodiment. In various embodiments, the traffic platform 111 and/or any of the modules 301-309 may perform one or more portions of the process 400 and may be implemented in, for instance, a chip set including a processor and a memory as shown in FIG. 10. As such, the traffic platform 111 and/or any of the modules 301-309 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the probe data module 301 retrieves a probe data set 201 comprising a plurality of probe data points as listed in Table 1 collected from a probe device, such as in-vehicle telematics. Probe data from different sources may come with different attributes (e.g., identifier, latitude, longitude, altitude, speed, heading, timestamp, etc.) and formats (e.g., various measurement units in different granularity/decimals). By way of example, each probe data point can defined with attributes such as but not limited to any combination of the following: (1) Probe ID: a probe data set identifier; (2) TIMESTAMP: Timestamp of measurement; (3) LAT: Latitude in degrees; (4) LON: Longitude in degrees; (5) DIRECTION: Angle in degrees ranging from 0-360 degrees; and (6) SPEED: Speed in km/h or mile/h, to be applicable to common probe data sets.

TABLE 1

| Probe ID | Timestamp | Latitude | Longitude | Direction | Speed |
|---|---|---|---|---|---|
| 201, | 2019-08-01 15:36:08, | 60.51172, | 24.92123, | 175, | 42 |
| 201, | 2019-08-01 15:46:08, | 60.51135, | 24.93883, | 175, | 45 |
| 201, | 2019-08-01 15:56:08, | 60.51627, | 24.91034, | 176, | 30 |
| 201, | 2019-08-01 16:06:08, | 60.47186, | 24.91248, | 176, | 33 |
| 201, | 2019-08-01 16:16:08, | 60.47217, | 24.92498, | 178, | 25 |
| 201, | 2019-08-01 16:26:08, | 60.47179, | 24.90718, | 210, | 30 |
| 201, | 2019-08-01 16:36:08, | 60.45617, | 24.90531, | 250, | 42 |
| 201, | 2019-08-01 17:00:24, | 60.47191, | 24.90577, | 150, | 40 |
| 201, | 2019-08-01 17:10:24, | 60.50661, | 24.9145, | 160, | 44 |
| ... | | | | | |

When the probe device is a mobile phone, a navigation device, or a telematics device, the identity of the probe device may be a mobile identification number (MIN), a mobile subscription identification number (MSIN), an international mobile subscriber identity (IMSI) or International Mobile Equipment Identity (IMEI), a mobile equipment identifier (MEID), an Integrated Circuit Card Identifier (ICCID), a Globally Unique Identifier (GUID), an IP address v4/v6, etc. When the probe device is a vehicle, the identity of the probe device may be a Vehicle Identification Number (VIN), a license plate number, . . . .

In other embodiments, the timestamp may be expressed in other formats, such as Wed Jan. 1-2019 6:00, 2019-10-30 T 10:45 UTC, 2019-11-09 T 11:20 UTC, Sat July 23 02:16:57 2019, 1256953732 (Unix time), (1919-07-21 T 02:56 UTC)-, 07:38, 11 Dec. 2019 (UTC), 2019-102 T 10:15 UTC (year 2019, day 102=12 Apr. 2019), 2019-W15-5 T 10:15 UTC (year 2019, week 15, day 5=12 Apr. 2019), 20190203073000 (Feb. 3, 2019 7:30:00), etc.

For LAT and LON, any location can be found on Earth using latitude and longitude coordinates measured using decimal degrees (DD), such as 60.2219702 24.7559331, or degrees/minutes/seconds (DMS), such as N 60° 13' 19.093" E 24° 45' 21.359".

In step 403, the ownership information module 303 determines the information to embed. In one embodiment, the information is a bit string of a specified length. By way of example, the bit string is "2a45f15b-8086-4218-b1dd-c1c3b54f3d7f", a Globally Unique Identifier (GUID) Universally Unique Identifier (UUID), i.e., a 128-bit integer number used to identify a source. As mentioned, the sources may be probe data providers and/or vendors, such as public entities operating fixed-sensor networks, cellphone carriers, etc. In another embodiment, the ownership information module 303 coverts ASCII text of a trade name of the owner (e.g., OWNER A) into a binary value string, such as "01001000 01000101 01010010 01000101 00100000 01000111 01101100 01101111 01100010 01100001 01101100".

Given the BIT-STRING of size L, the calculation module 305 defines BIT-STRING[i] for 0<=i<L to select the i-th bit (0 or 1) of the BIT-STRING. By way of example, the calculation module 305 defines a UNIT=0.0001 degrees, which is approximately 11 meters at the equator. This example UNIT size (e.g., 11 meters), for instance, corresponds approximately to the average current error of a typical satellite-based location sensor (e.g., a Global Positioning System (GPS) based location sensor). Accordingly, in one embodiment, the UNIT size can be set dynamically based on the calculated or expected error of the data in the data stream. Sample objects that can be unambiguously recognized at this scale include an individual street, a land parcel, etc By analogy, the UNIT size can be set dynamically for other systems of a higher or lower precision level, such as Galileo Navigation Satellite System, BeiDou Navigation Satellite System (BDS), GLObal NAvigation Satellite System (GLONASS), etc.

The calculation module 305 quantizes latitude data LAT and longitude data LON of the at least one probe data point into a repeating grid of a size roughly L, where each cell's edge has a size as the UNIT according to the transformation functions listed in Table 2. In other words, the UNIT length (e.g., 0.0001 degrees) is used as the discrete range for assigning a probe data point into a respective grid cell. In one embodiment, the number of cells in the grid can be determined based on the length of the bit string that is to be embedded into the probe data set. For example, there can be a one-to-one correspondence between each cell of the grid and each bit of the bit string or portion of the bit string that is to embed. In this case, the mapping of the grid cells to the bits of the bit string can be based on any scheme including but not limited to: grid cell 1 can correspond to the first bit of the bit string, grid cell 2 can correspond to the second bit of the bit string, and so on. In one embodiment, the dimensionality of the grid can be based on the number attributes selected to create the grid. For example, selecting two attributes of the probe data point (e.g., latitude and longitude) will result in a two-dimensional grid or array, which selecting three attributes of the probe data point (e.g., latitude, longitude, and altitude) can be used to create a three-dimensional array (e.g., represented by a cube), and so on.

In one embodiment, the calculation module 305 can create a grid cell index to identify which grid cells are associated with which bits of the bit string that are to be embedded. The grid cell index of the at least one probe data point in the repeating grid can then be used to select the at least one bit of the bit string. The selected bit can then be embedded into the probe data point contained in the corresponding grid cell. The calculation module 305 modulates the at least one bit into speed data of the at least one probe data point using any modulation scheme including but not limited to the example pseudocode illustrated in Table 2 below.

TABLE 2

Let M = ceil(sqrt(L)), i.e. round up the square root of L.
For each point in POINTS given as LAT, LON, SPEED do:
    Let x = ceil (LAT / UNIT) modulo M.
    Let y = ceil (LON / UNIT) modulo M .
    Let i = x * M + y.
    If i < L, change SPEED in the following way:
        If BIT-STRING[i] is 0, make SPEED an even integer.
        Otherwise make SPEED an odd integer.

In the example of Table 2, the calculation module 305 has selected two attributes (e.g., latitude and longitude) for quantizing and one attribute (e.g., speed) for embedding. Accordingly, a two-dimensional grid is created with the x-axis representing latitude and the y-axis representing longitude. However, in one embodiment, it is contemplated that any number or selection of attributes can be used for either quantizing or embedding (e.g., 1—latitude, longitude, and speed for quantizing and direction for embedding; 2—speed and latitude for quantizing and longitude for embedding, etc.). The example process of Table 2 begins with determining a value M that is the square root of the bit length L rounded up to the nearest whole number (e.g., via ceil( ) function or equivalent). The value M, for instance, represents the side length in grid cells of the x-axis and y-axis of the grid. For each probe point in the data stream, the calculation module 305 determines a cell index based on the x-axis and y-axis with a x index value equal to the latitude attribute value of the probe point divided by the unit size (UNIT) and modulated based on the M value. The modulation to M, for instance, enables the grid to repeat across a large geographic area by transposing the grid structure repeatedly across latitude and longitude (or across any other range of selected attribute values). Similarly, the y index value is calculated as the longitude attribute value of the probe point divided by the unit size UNIT and modulated based on the M value. The calculation module 305 then determines the grid cell index i that indicates the bit of the bit string that corresponds to the probe point. If the resulting value of i is less than the bit string length L, then the calculating module 305 embeds the corresponding bit value in the embedding attribute (e.g., speed) by changing the speed attribute value to an even integer if the corresponding bit value is 0 and to an odd integer value if the bit value is 1. The algorithm of Table 2 is further described below with respect to FIGS. 5A and 5B.

Figure 5A:
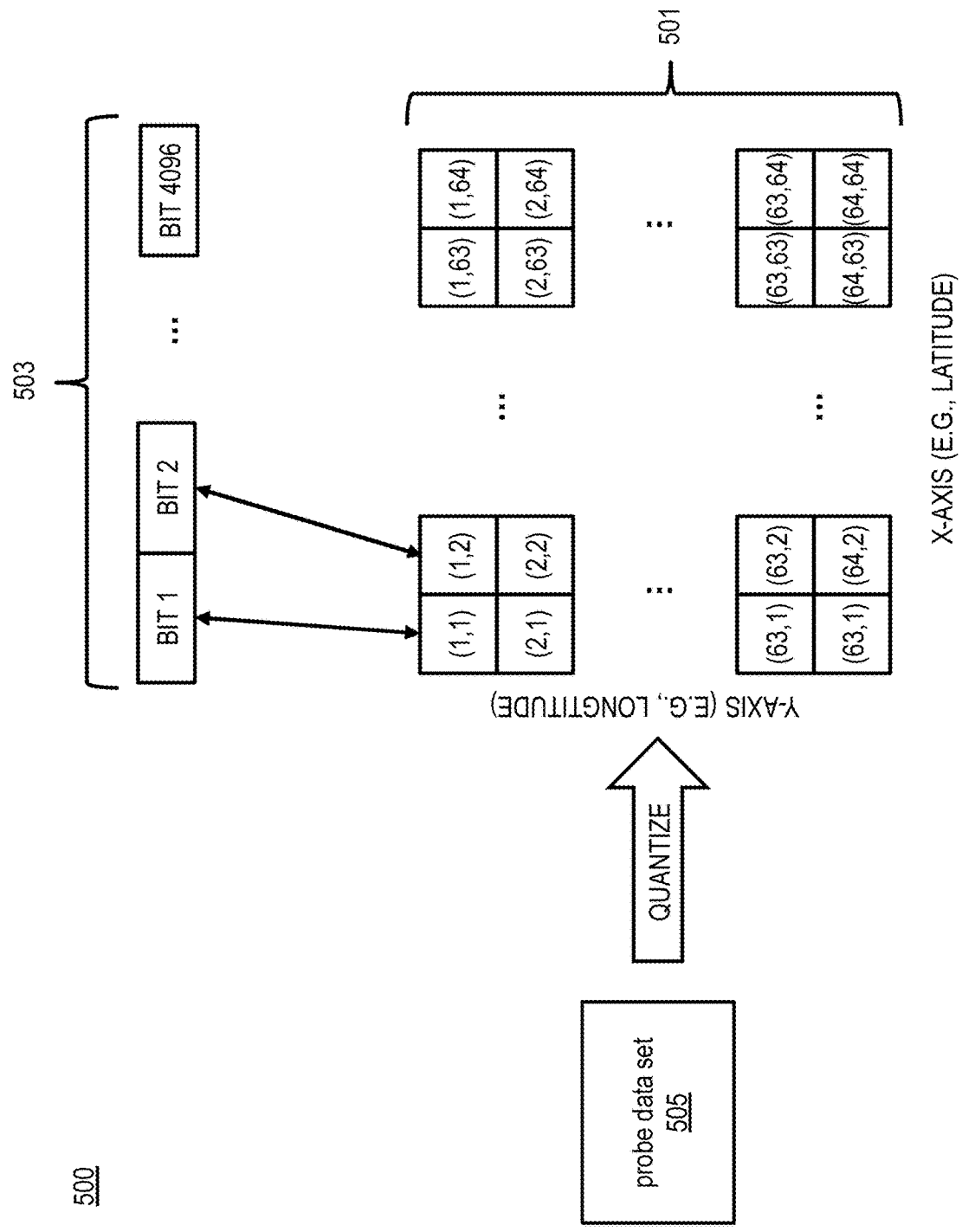
FIG. 5A is a conceptual diagram of a repeating grid, according one embodiment.

FIG. 5A is a diagram 500 of a repeating grid 501 indexed to a bit string 503 that is to be embedded into a probe data set 505, according one embodiment. The repeating grid 501 has a grid size based on the specified length of the bit string 503 and a cell edge size based on a specified unit measurement. In this example, the bit string 503 (e.g., BIT-STRING) has a length of 4096 bits (e.g., spanning from Bit 1 to Bit 4096). The system 100 has also selected latitude and longitude as the probe attribute values to quantize the probe data set 505 and generate the grid structure 501 with an x-axis representing latitude values and a y-axis representing longitude values. Based on this, the repeating grid 501 has 64×64 cells (e.g., the square root of L=4096 is 64) with 11 m×11 m size each (e.g., based on a UNIT size of 0.0001° or 11 m). As a result, the repeating grid 501 is roughly 704 m×704 m in size, which is repeated over a geographic in 704 m$^2$ segments. As shown, the grid 501 includes a 4096 cells (e.g., indexed from Cell(1,1) through Cell(64,64)) that corresponding respectively to one bit of the bit string 503 (e.g., Cell(1,1) corresponds to Bit 1, Cell(1,2) corresponds to Bit 2, up to Cell(64,64) corresponding to Bit 4096). In this example, each cell of the grid 501 corresponds to an 11 m×11 m area whose grid cell index is derived from the latitude and longitude values of the individual probe data points of the probe data set 505 (e.g., according to the algorithm illustrated in Table 2). This results in quantizing the probe data points of the probe data set 503 into respective grid cells denoted by the calculated grid cell index. By way of example, quantizing refers to binning or grouping continuous values of the probe attribute values into discrete values or ranges (e.g., discrete ranges represented by each individual grid cell).

The calculation module 305 selects a bit (e.g., a least significant bit or digit) of the speed data corresponding to one or more probe points within a grid cell, and then modulates the bit of the bit string that corresponds to the grid cell (e.g., based on the grid cell index) into the speed data of the corresponding probe point(s). In one embodiment, the modulating or embedding of the bit of the bit string (e.g., the watermark data) includes but is not limited to setting a speed value of the speed data to an even integer or an odd integer based on a bit value of the at least one bit of the bit string. In other words, the bit of information (e.g., watermark) is encoded by transforming at least one digit of the speed value of the probe point in probe data set 503 to either an even or odd number. In one embodiment, the one bit of the bit string is embedded into the least significant digit of the speed value (e.g., the least significant digit of the speed value is changed to even if the bit value to embed is 0 or odd if the bit value to embed is 1). Table 3 below illustrates an example of the embedding process.

TABLE 3

| Bit Value to Embed | Original Speed Value Digit | Speed Value Digit with Embedded Bit Value |
|---|---|---|
| 0 | 3 | 4 |
| 1 | 5 | 5 |
| 1 | 2 | 3 |
| 0 | 8 | 8 |

In the example of Table 3, a bit string segment of four bits (0110) is to be embedded into four corresponding probe data points with respective least significant speed value digits equal to 3, 5, 2, and 8. Because the first bit value to embed is 0, the system 100 is configured to change the speed value digit to an even number to encode a 0. Therefore, the system 100 can change the corresponding speed value digit from 3 to a 4 to make the digit even. Because the second bit value to embed is 1, the system 100 is configured to change the speed value digit to an odd number to encode a 1. Therefore, the system 100 can leave the original speed value digit of 5 because it is already an odd number. Because the third bit value to embed is also a 1 but this time the corresponding speed value digit is 2 (an even number), the system 100 can change the speed value digit from 2 to a 3 to encode a 1. Finally, because the fourth bit value to embed is a 0 and the corresponding speed value digit is already an even number (e.g., 8), the system 100 can leave the original speed value digit an 8 to encode a 0.

In step 405, the embedding/extracting module 307 iteratively selects at least one bit of the bit string to embed into at least one probe data point of the plurality of probe data points to generate an embedded probe data set until at least a predetermined portion (or all) of the bit string is embedded. For example if the information or bit string to embed is 4096 bits long, the iterative embedding process can continue until all or a designation portion (e.g., first 1024 bits, every other bit of the bit string, etc.) of the bit string has been embedded. In one embodiment, as previously discussed, the bit of the speed data is a least significant bit/byte (e.g., least significant digit) of the speed data to minimize the distortion of the speed data (e.g., introduction of noise). In one embodiment, if noise is not an issue, the embedding/extracting module 307 can embed multiple bits into one probe point by selecting more than one digit or bit of the selected probe attribute value to change. In addition or alternatively, the embedding/extracting module 307 can select multiple attributes (e.g., speed and direction) of the same probe point, and then embed different bits into each of the multiple data attributes.

In one embodiment, the embedding can be performed on a bit level in addition or as an alternate to the digit level described in the embodiments above. For example, the speed 42 km/h is encoded in binary as "00110100 00110010," which has a least significant bit of "0". If the corresponding bit to embed is "1", the calculation module 305 modulates the bit to embed "1" into the least significant bit "0" of the speed data. The embedding/extracting module 307 replaces the least significant bit "0" of the speed data with the at least one bit "1", such that the speed data is converted into 43 m/h which in binary as "00110100 00110011."

In another embodiment, as the speed value bit of the probe data set is "1", the calculation module 305 modulates the bit to embed "1" into the least significant byte "2" of the speed data of 42 m/h, by making the least significant byte "2" into an odd integer, such as "1" or "3". The embedding/extracting module 307 replaces the least significant byte "2" of the speed data with "1" or "3", such that the speed data is converted into 41 or 43 m/h which in binary as "00110100 00110001" or "00110100 00110011."

In one embodiment, all of the L number of bits in the BIT-STRING are embedded into the probe data set 201. In another embodiment, only a predetermined number of the bits of the BIT-STRING are embedded into the probe data set 201, while disregarding the remaining bits of the BIT-STRING. For example, the disregarded bits of the BIT-STRING are error-correction block codec (e.g., redundant bits).

Under some circumstances, such as when the owner does not require a full 4096 bit string, but only to embed 128 bits, the system 100 applies an error-correcting block code (e.g., Reed-Solomon-Code) to inflate the 128 bits into 4096 bits and embeds that inflated code into a probe data set. In this case, only a fraction of the probe data set has to be extracted to reconstruct the watermark embedded therein. In other words, the system 100 embeds a BIT-STRING of length L into a code of length M by: applying an error-correction block codec of length M to BIT-STRING to provide BIT-STRING2, and then embeds BIT-STRING2 into POINTS of the probe data set.

In one embodiment, the embedding/extracting module 307 applies error-correction-codes to the information (e.g., a watermark) before the embedding, in order to preserve the accuracy of the BIT-STRING after transmission. By way of example, the embedding/extracting module 307 generates another bit string based on the example bit string "01001000 01000101 01010010 01000101 00100000 01000111 01101100 01101111 01100010 01100001 01101100" by applying an error-correction block codec (e.g., one or more redundant bits) to the bit stream.

The original watermark may or may not appear literally in the encoded output. In one instance, a redundant bit is added to one original watermark. By way of example, adding an even parity bit "0" to the end of the bit string to ensure an even number (i.e., 36) of "1"s of the error-coded bit stream. In another instance, a redundant bit may be a complex function of many original watermark bits, such as cyclic redundancy check (CRC). The embedding/extracting module 307 embeds the error-coded bit string into the probe data set 201 in place of the bit string to generate the embedded probe data set. The redundancy allows the receiver to detect a limited number of errors that may occur anywhere in the bit-string, and to correct these errors without re-transmission.

In yet another embodiment, the embedding/extracting module 307 can add an encryption layer to conceal the information (e.g., a watermark or an ownership of the probe data set) from third parties. By way of example, the embedding/extracting module 307 initiates an encryption of the information prior to embedding. The encryption key may be a Machine key, a WPA key, a WEP key, etc.

The kay may be based on a hash computed from an identity of the probe device, an identifier of a supplier of the probe data, a random number (e.g., "B?E(H+MbQeShVmYq"), or a combination thereof. The key can be used to prove an ownership of the probe data set 201. In one instance, the encryption uses a key K which is a random 128 bit number or identify the vehicle number that collects probe data set.

In step 407, the communication module 309 provides the embedded probe data set as an output, to a probe data library or database to be available for all kinds of probe data applications and/or processing, such as navigation services, mobile workforce management, traffic management, etc.

The above embedding scheme uses the latitude, longitude, and speed attributes of a probe data point as an example. In other embodiments, the calculation module 305 can quantizes any two attributes of one probe data point into a repeating grid, and modulate one bit of a watermark into a third attribute of the data point. The three attributes can be any three attributes of one probe data point, such as identifier, latitude, longitude, altitude, speed, heading, timestamp, etc.

When a probe data set is too short or too spotty for embedding the bit string of length L, the system 100 may skip embedding the watermark in the probe data set, or choose a shorter watermark to embed. When a probe data set has a coverage area too small for embedding the bit string, such that the POINTS do not touch each cell at least once, the system 100 may skip embedding the watermark in the probe data set, or make the unit smaller (e.g., than 11 meters).

Figure 5B:
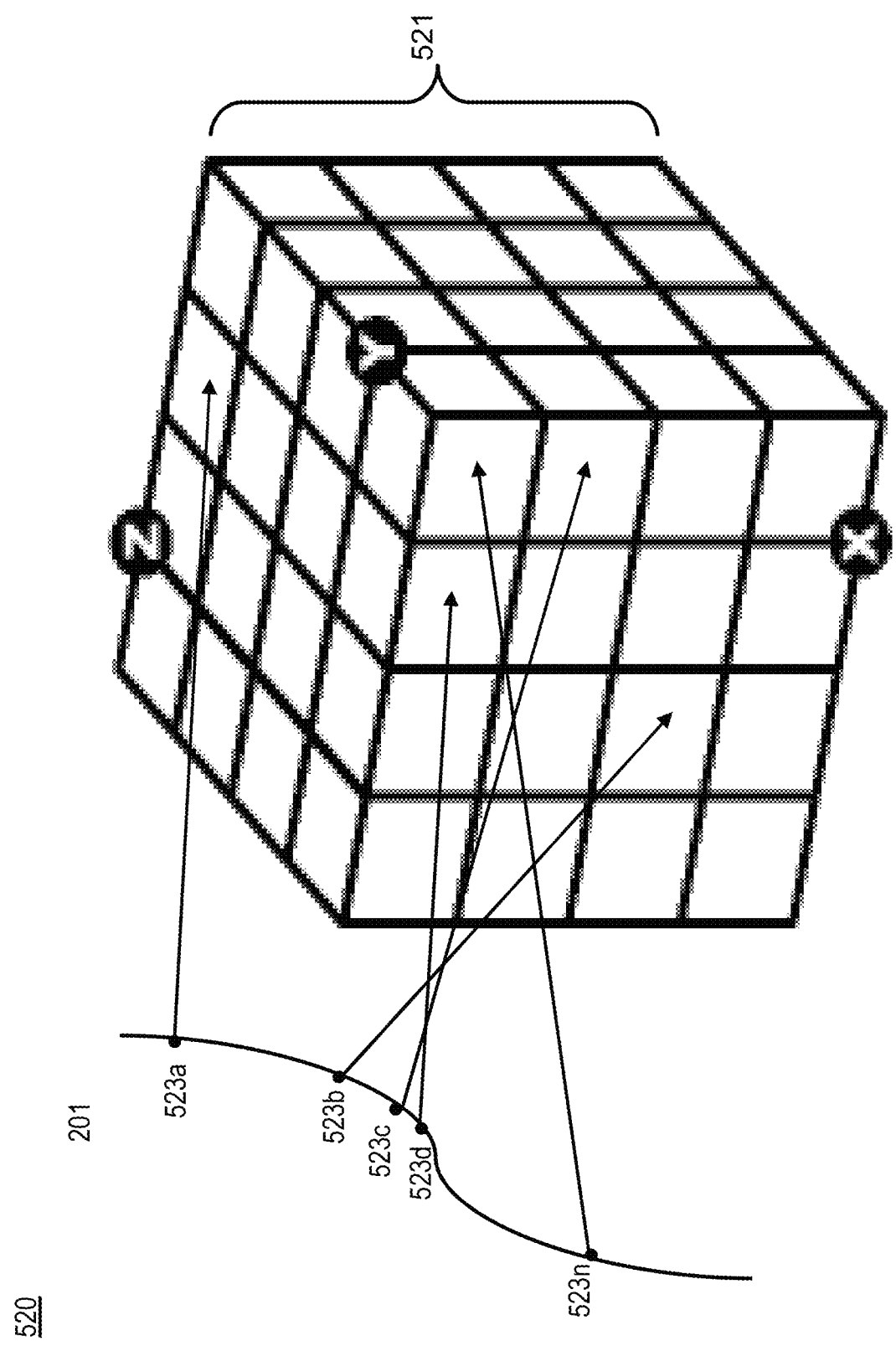
FIG. 5B is a conceptual diagram of a repeating cube, according one embodiment.

In other embodiments, as previously discussed the system 100 can embed a bit string into a data stream based on higher dimensional arrays or data structures (e.g., a 3D repeating cube 521 as shown in FIG. 5B by quantizing any three attributes of one probe data point into a repeating cube 521 of an edge size L, and modulating one bit of a watermark into a fourth attribute of the probe data point. By way of example, the calculation module 305 quantizes latitude data LAT, longitude data LON, and timestamp data TIME of the at least one probe data point into a repeating cube of a size roughly L, where each cube cell's edge has a size as the UNIT according to the transformation functions listed in Table 4. A cube cell index of the at least one probe data point in the repeating cube is used to select the at least one bit of the bit string or the bit array/map. The calculation module 305 modulates the at least one bit into speed data of the at least one probe data point.

TABLE 4

Let M = ceil(cube (L)), i.e. round up the cube root of L.
For each point in POINTS given as LAT, LON, TIME, SPEED do:
    Let x = ceil (LAT / UNIT) modulo M.
    Let y = ceil (LON / UNIT) modulo M .
    Let z = ceil (TIME / MIN) modulo M .
    Let i = x * M + y * M + z.
    If i < L, change SPEED in the following way:
        If BIT-STRING[i] is 0, make SPEED an even integer.
        Otherwise make SPEED an odd integer.

FIG. 5B is a conceptual diagram 520 of a repeating cube 521, according one embodiment. The repeating cube 521 has a cube size based on the specified length of the bit string and a cube cell edge size based on a specified unit measurement. By way of example, assuming the BIT-STRING has L=4096. The repeating grid 501 has 16×16×16 cube cells with 11 m×11 m×11 m size each, so the repeating cube 521 is roughly 176 m×176 m×176 m big. Cell (3, 4, 5) would select 117-th bit (3*16+4*16+5), which is "1". The repeating cube 521 is simplified as with 4×4×4 cube cells in FIG. 5B. By analogy, the embedding scheme of FIG. 5A can be carried out by the calculation module 305 and the embedding/extracting module 307 to embed the BIT-STRING into the probe data set 201.

Figure 6:
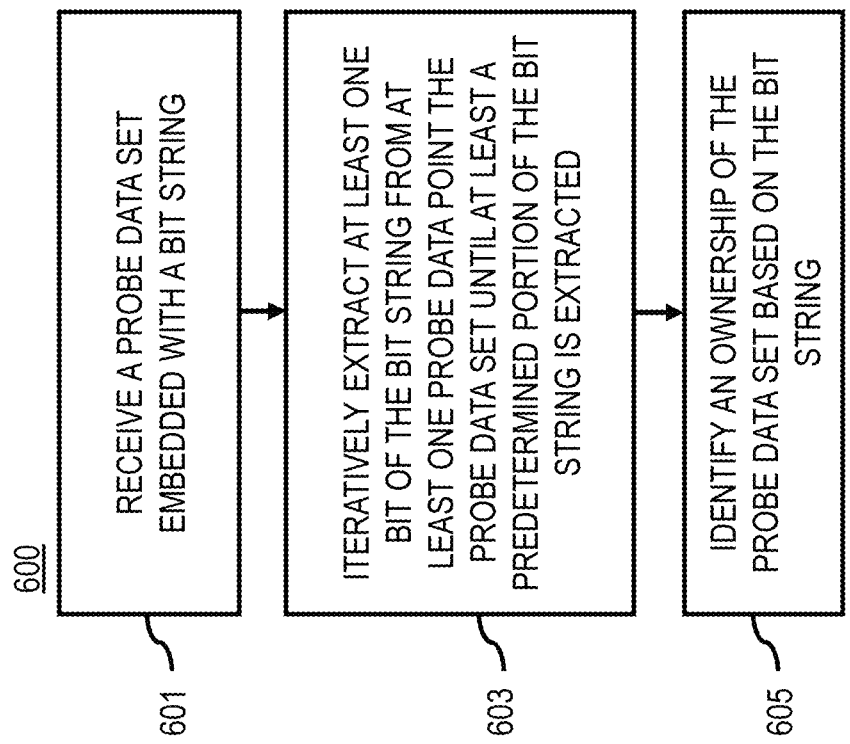
FIG. 6 is a flowchart of a process for extracting information from one probe data set originated from one probe device, according to one embodiment.

FIG. 6 is a flowchart of a process for extracting information (such as a watermark) from one probe data set originated from one probe device, according to one embodiment. In various embodiments, the traffic platform 111 and/or any of the modules 301-309 may perform one or more portions of the process 600 and may be implemented in, for instance, a chip set including a processor and a memory as shown in FIG. 10. As such, the traffic platform 111 and/or any of the modules 301-309 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps.

In step 601, the probe data module 301 receives a probe data set embedded with information. The probe data set comprises a plurality of probe data points collected from a probe device, and the information is a bit string of a specified length L=4096, and M=64. The repeating grid 501 has 64×64 cells with 11 m×11 m size each, so the repeating grid 501 is roughly 704 m×704 m big.

The calculation module 305 quantizes latitude data and longitude data of the at least one probe data point into a grid cell index (e.g., Cell (3, 4)) of a repeating grid, and uses the grid cell index to select a position in the bit string (e.g., 196-th bit (3*64+4)) for the at least one bit. The calculation module 305 reconstructs the bit string by setting the bit value of the at least one bit in the position 196-th bit in the bit string.

TABLE 5

Initialize BIT-STRING to L zeros
Let M = ceil(sqrt(L)), i.e. round up the square root of L
For each point given as LAT, LON, SPEED in POINTS do:
    Let x = ceil(LAT / UNIT) modulo M.
    Let y = ceil(LON / UNIT) modulo M.
    Let i = x * M + y.
    If i < L and if SPEED is odd, set BIT-STRING[i] to 1.

The calculation module 305 de-modulates speed data (e.g., 41 km/h) of the at least one probe data point into a bit value of the bit of the bit stream. In one embodiment, the calculation module 305 selects a least significant bit of the speed data for the de-modulating. In another embodiment, the calculation module 305 de-modulates the speed data into the at least one bit by converting an even integer or an odd integer of a speed value of the speed data as the bit value of the at least one bit. For example, the calculation module 305 de-modulates speed data (e.g., 41 km/h) of the at least one probe data point into a bit value "1" of the 196-th bit of the bit stream.

In step 603, the embedding/extracting module 307 iteratively extracts at least one bit of the bit string from at least one probe data point of the plurality of probe data points of the probe data set until at least a predetermined portion of the bit string is extracted.

In one embodiment, prior to or in addition to the extraction of the embedded information, the embedding/extracting module 307 can evaluate the distribution of the attribute values for the attribute where the embedding/extracting module 307 expects there to be embedded information (e.g., the speed attribute values). The evaluation includes calculating the distribution of the attribute values and comparing the distribution against distributions that would be expected with either marked or unmarked data. For example, in most cases unmarked or raw probe data generally would have a normal distribution of speed values such that the embedding/extracting module 307 would expect to see a distribution of speed values with approximately equal numbers of speed values that end in odd numbers and speed values that end in even numbers.

However, if information or a watermark that was added changed this distribution, the changed distribution can be detected and used as an indicator of whether the probe data set being evaluated has a watermark or other embedded information. For example, if an embedded bit string is constructed with higher percentage of 0 values versus 1 values (or vice versa), the resulting embedded data stream would exhibit a distribution of odd versus even speed values (or other selected attribute values) that differs from approximately 50/50 that would be expected for unmarked probe data with a normal distribution. Accordingly, in one embodiment, the embedding/extracting module 307 can evaluate the distribution of embedded attribute to determine a deviation for an expected or reference distribution. If a deviation is not detected, the embedding/extracting module 307 need not perform the information extraction process to advantageously reduce computational resource requirements associated with the extraction process. If a deviation is detected, the embedding/extracting module 307 can classify the probe data set has having previous ownership of other embedded information without having to actually decode the information. In another embodiment, the detection of a deviation can be used to trigger the information decoding or extraction process if needed.

In another embodiment, the calculation module 305 initiates a decryption of the bit string. The decryption uses a key and a hash (e.g. SHA1, MD5) computed from an identity of the probe device, a random number, or a combination thereof.

In yet another embodiment, the calculation module 305 generates another bit string based on the bit string by removing an error-correction block codec. The another bit string is applied with the error-correction block codec and then embedded into the probe data set. Referring back to the example of BIT-STRING2, to extract BIT-STRING, the embedding/extracting module 307 extracts BIT-STRING2 of length M from the POINTS of the probe data set, and decodes BIT-STRING2 into BIT-STRING using the same error-correction block codec. The error-correction-codecs provides some robustness yet adding noise to LAT/LON/SPEED and reducing the value of the probe data set.

In step 605, the ownership information module 303 identifies an ownership of the probe data set by matching the bit string with watermarks stored in the geographic database 109.

Returning to FIG. 1, in one embodiment, the traffic platform 111 has connectivity over a communication network 117 to other components of the system 100 including but not limited to probe data 101, services platform 103, services 105, content providers 107, geographic database 109, and/or vehicles 113 (e.g., probes). By way of example, the services 105 may also be other third-party services (e.g., crowd-sourced services) and include probe data sourcing services, mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 103 uses the output (e.g. probe data sets embed with a water mark) of the traffic platform 111 to provide services such as navigation, mapping, other location-based services, etc.

In one embodiment, the vehicles 113 also have connectivity to the UEs 119 having connectivity to the traffic platform 111 via the communication network 117. In one embodiment, the traffic platform 111 may be a cloud-based platform that embed information into a probe data set. In one embodiment, the sensors 115a-115k (also collectively referred to herein as sensors 115) (e.g., camera sensors, light sensors, Light Detection and Ranging (LiDAR) sensors, Radar, infrared sensors, thermal sensors, and the like) acquire probe data sets, such as 201, 203, 205, 207, and 209 are within the map 200.

In one embodiment, the UEs 119 can be associated with any of the vehicles 113 or a user or a passenger of a vehicle 113. By way of example, a UE 119 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 119 can support any type of interface to the user (such as "wearable" circuitry, etc.). In one embodiment, the vehicles 113 may have cellular or wireless fidelity (Wi-Fi) connection either through the inbuilt communication equipment or the UEs 119 associated with the vehicles 113. Also, the UEs 119 may be configured to access the communication network 117 by way of any known or still developing communication protocols.

In one embodiment, the traffic platform 111 may be a platform with multiple interconnected components (i.e., distributed). In one instance, the traffic platform 111 may include multiple servers, intelligent networking devices, computing devices, components and corresponding software for providing parametric representations of lane lines. In addition, it is noted that the traffic platform 111 may be a separate entity of the system 100, a part of the one or more services 105, a part of the services platform 103, or included within a vehicle 113.

In one embodiment, the content providers 107 may provide content or data (e.g., including geographic data, parametric representations of mapped features, etc.) to the services platform 103, the services 105, the geographic database 109, the traffic platform 111, and the vehicles 113. The content provided may be any type of content, such as traffic anomaly or incident content (e.g., road closure reports), map content, textual content, audio content, video content, image content, etc. In one embodiment, the content providers 107 may provide content that may aid in embedding information into a probe data set. In one embodiment, the content providers 107 may also store content associated with the services platform 103, services 105, geographic database 109, traffic platform 111, and/or vehicles 113. In another embodiment, the content providers 107 may manage access to a central repository of data, and offer a consistent, standard interface to data, such as a repository of the geographic database 109.

In one embodiment, the vehicles 113, for instance, are part of a probe-based system for collecting probe data for embedding information (e.g., a watermark) therein. In one embodiment, each vehicle 113 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 113 may include sensors 115 for reporting measuring and/or reporting attributes. The attributes can also be any attribute normally collected by an on-board diagnostic (OBD) system of the vehicle, and available through an interface to the OBD system (e.g., OBD II interface or other similar interface). In one embodiment, this data allows the system 100 to determine a probe entry point, a probe exist point, or a combination thereof occurring at a boundary of the partition (e.g., partition 201).

The probe points can be reported from the vehicles 113 in real-time, in batches, across a plurality of time epochs, continuously via streaming or a channel, or at any other frequency requested by the system 100 over, for instance, the communication network 117 for processing by the traffic platform 111. The probe points also can be mapped to specific road links stored in the geographic database 109.

In one embodiment, a vehicle 113 is configured with various sensors 115 for generating or collecting vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for embedding information into probe data to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of a vehicle 113 may include orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of a vehicle 113 may detect the relative distance of the vehicle from a physical divider, a lane or roadway, the presence of other vehicles (e.g., distances between vehicles during free flow travel and distances during periods of high congestion), pedestrians, traffic lights, potholes and any other objects, or a combination thereof. In one scenario, the sensors may detect weather data, traffic information, or a combination thereof. In one embodiment, a vehicle 113 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the services platform 103, services 105, content providers 107, traffic platform 111, and/or vehicles 113 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7A:
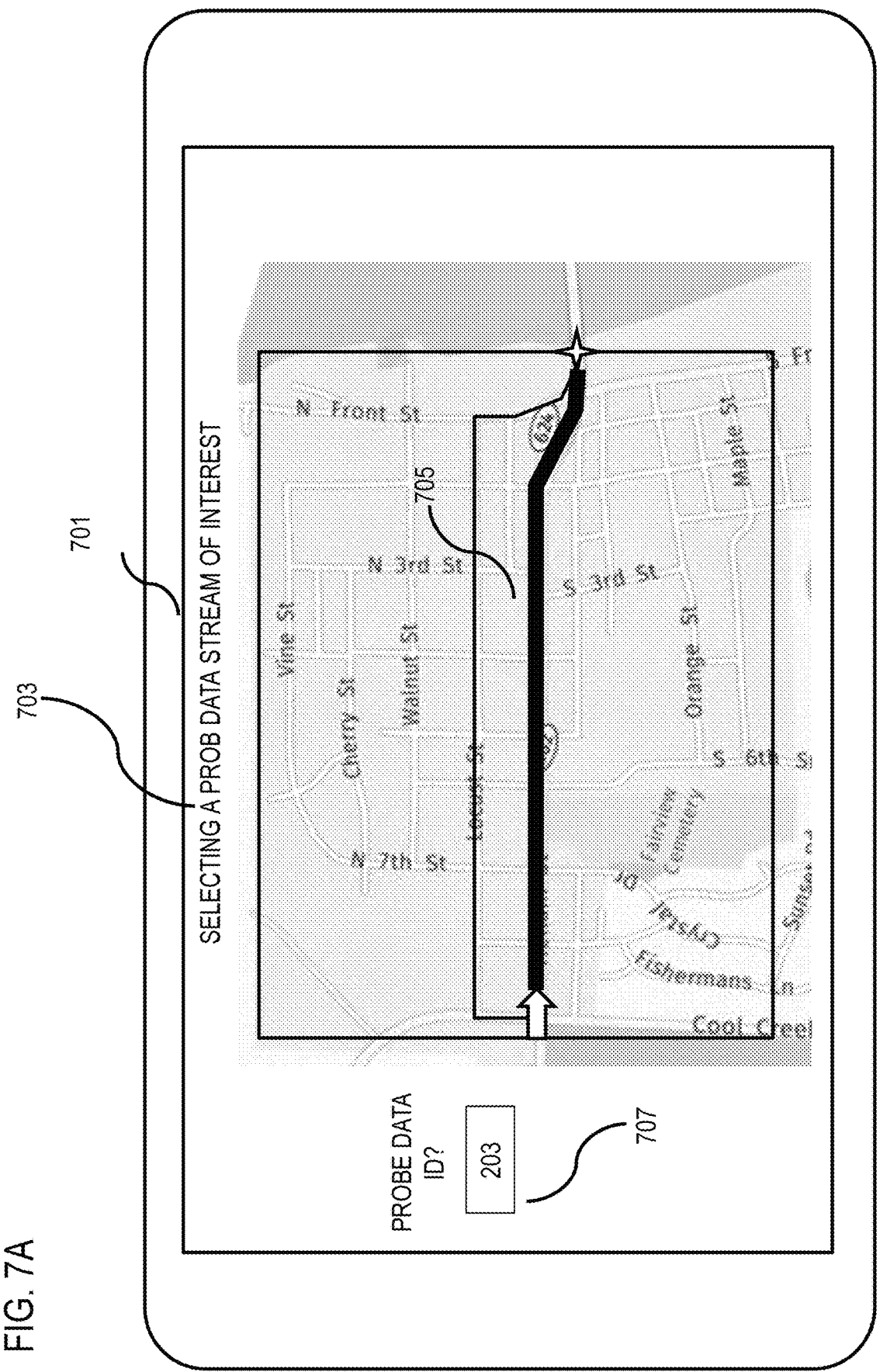
FIGS. 7A-7F are diagrams of example user interfaces for detecting information in probe data, according to various embodiments.
Figure 7B:
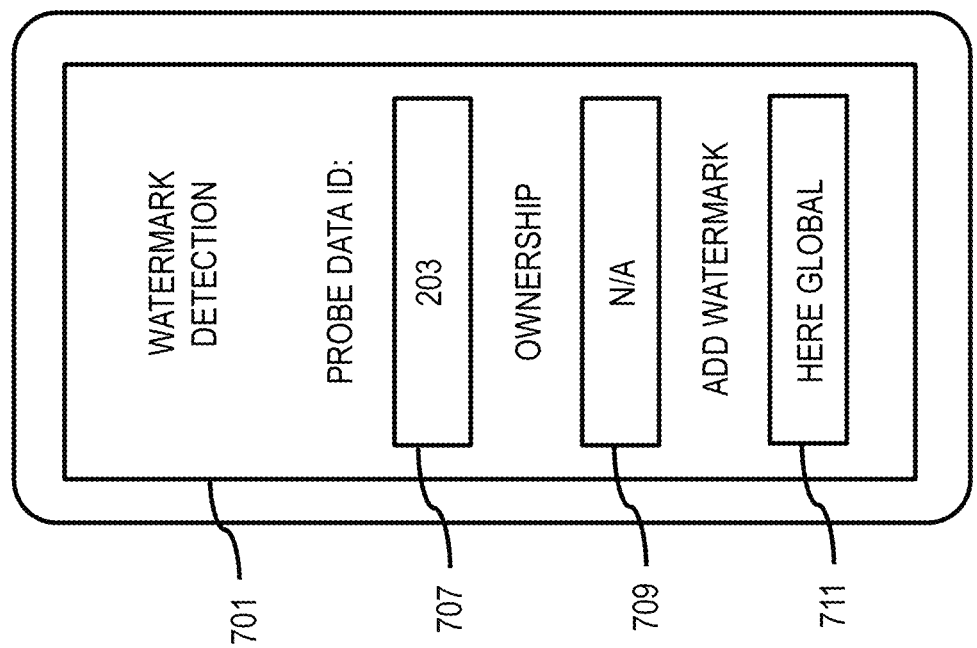

FIGS. 7A-7F are diagrams of example user interfaces for detecting information in probe data, according to various embodiments. In FIG. 7A, a UI 701 is generated for a UE 119 (e.g., a vehicle navigation device, a mobile device, or a combination thereof) that includes an input 703 that enables a user to select a probe data set 705 on a map to check if any watermark was embedded therein.

In one embodiment, based on the user's selection of the probe data set 705 that correspond to the probe data set 203 in FIG. 2, the system 100 first extracts Probe ID 203 from the probe data set 705, and displays the Probe ID in a box 707, when available.

In one embodiment, the system 100 attempts to extract any watermark embedded in the probe data set 705. When no watermark is detected based on known watermarks in the geographic database 109, the system 100 displays "N/A" in an Ownership box 709 in FIG. 7B. In addition, the system 100 prompts the user to select a watermark to add to the probe data set 705 in an Add Watermark box 711 in FIG. 7B, for example "OWNER A".

Figure 7C:
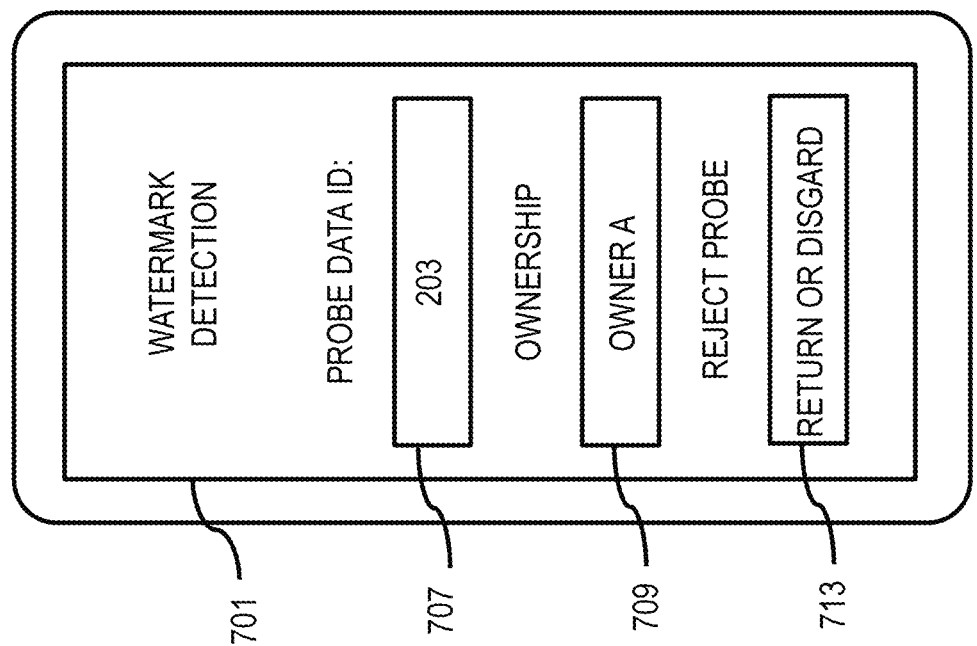

When a watermark is detected based on known watermarks in the geographic database 109, the system 100 displays the owner, for example "OWNER A", in an Ownership box 709 in FIG. 7C. Since the system 100 determines the probe data set 705 is owned by OWNER A, a user associated with OWNER A shall not pay for the probe data set 705 redistributed by a third party back to OWNER A. Therefore, the system 100 prompts the user to reject the probe data set 705 in a Reject Probe box 713 in FIG. 7C, by displaying "Return or Discard" in the Reject Probe box 713.

Figure 7D:
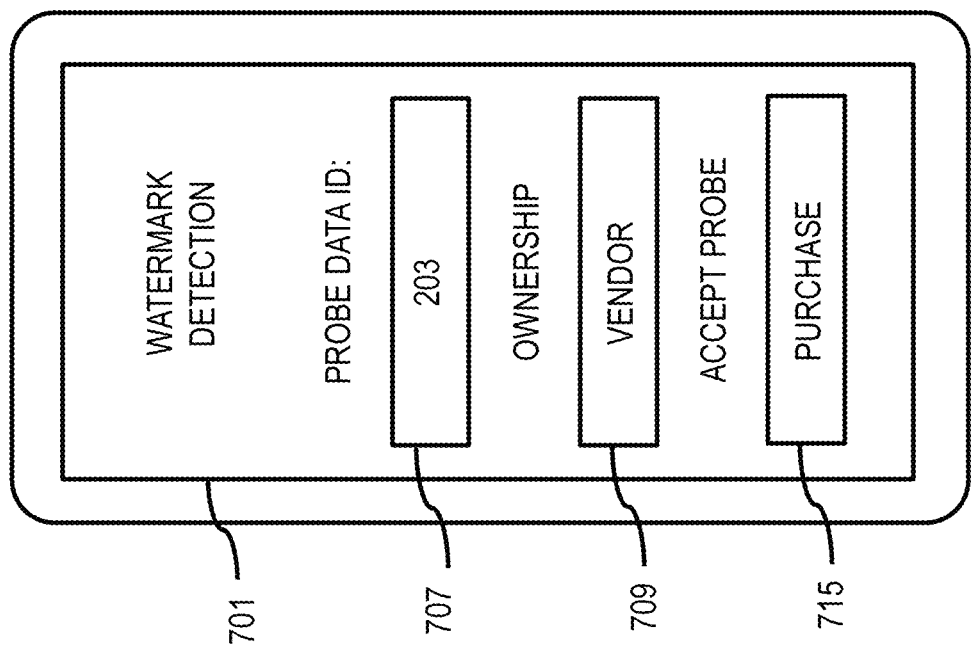
Figure 7E:
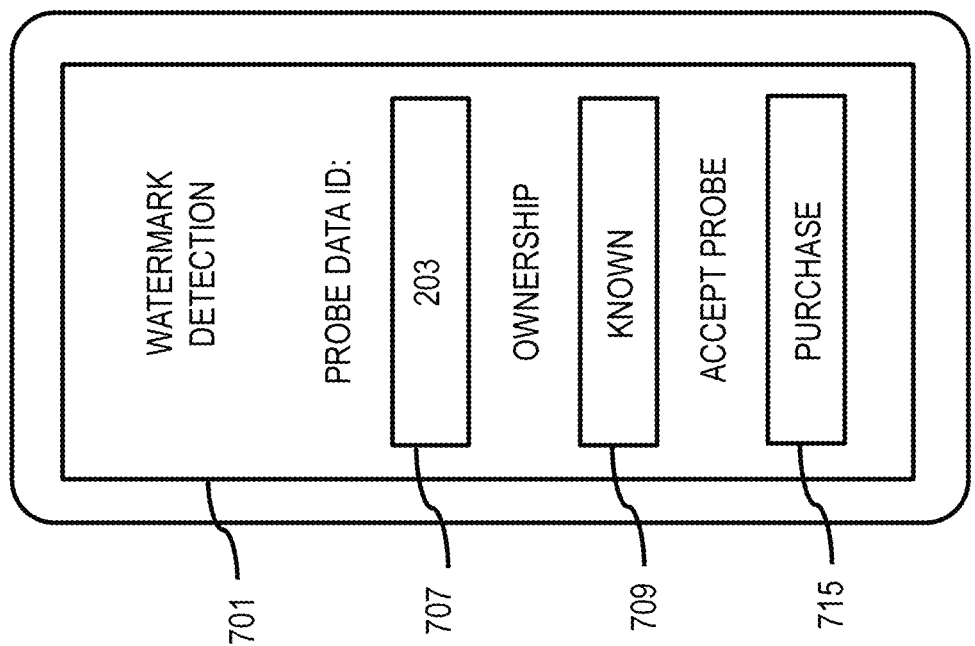

When a watermark is detected based on known watermarks in the geographic database 109, the system 100 displays the owner, for example "VENDOR", in an Ownership box 709 in FIG. 7D. Since the system 100 determines the probe data set 705 is not owned by OWNER A, a user associated with OWNER A shall pay for the probe data set 705 distributed by a third party to OWNER A. Therefore, the system 100 prompts the user to pay for the probe data set 705 in an Accept Probe box 715 in FIG. 7D, by displaying "Purchase" in the Accept Probe box 715.

For a client that sources probe data from a vendor, such as OWNER A, the system 100 attempts to extract any watermark embedded in the probe data set 705. When a watermark is detected based on known watermarks in the geographic database 109, the system 100 displays the owner, as "Known", in an Ownership box 709 in FIG. 7E. Since the system 100 determines the probe data set 705 is owned by a known vendor, a user associated with OWNER A shall pay for the probe data set 705 distributed by the vendor. Therefore, the system 100 prompts the user to pay for the probe data set 705 in an Accept Probe box 715 in FIG. 7E, by displaying "Purchase" in the Accept Probe box 715.

Figure 7F:
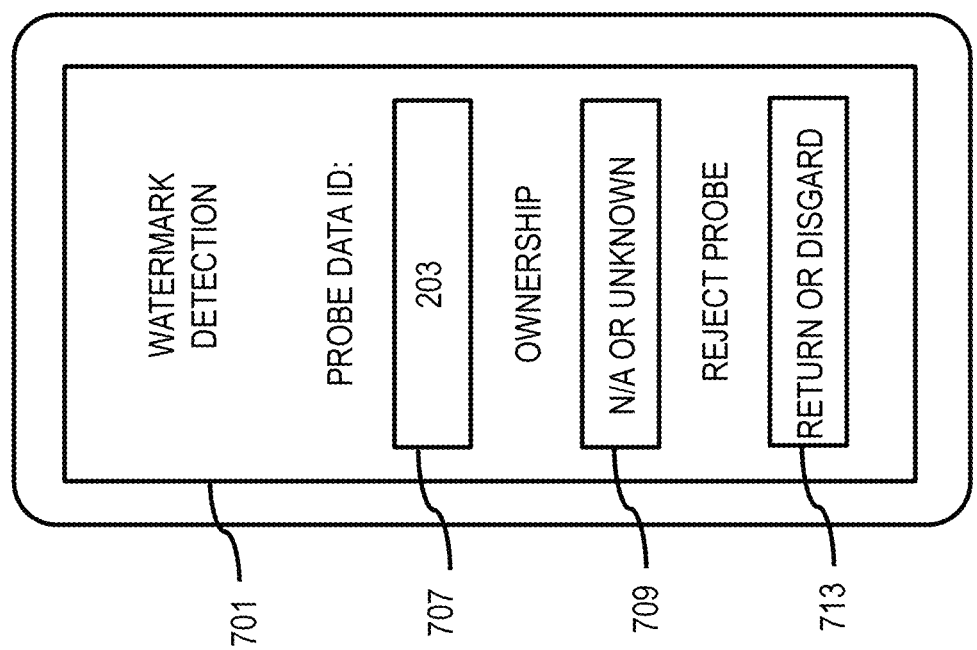

However, when no watermark is detected or a watermark is detected as unknown, the system 100 displays "N/A OR UNKNOWN", in an Ownership box 709 in FIG. 7F. Since the system 100 determines the probe data set 705 is owned by a known vendor, a user shall not pay for the probe data set 705. Therefore, the system 100 prompts the user to reject the probe data set 705 in a Reject Probe box 713 in FIG. 7F, by displaying "Return or Discard" in the Reject Probe box 713. In another embodiment, if the watermark is missing or there is no known owner of the probe data, an application using the probe data can reject the use of the data or reduce available functions (e.g., navigation function, real-time traffic monitoring, etc.) as a form of digital rights management. In other words, the application can be configured to run using only data streams that have been appropriately marked and identified as valid for use with the application or service.

Figure 8:
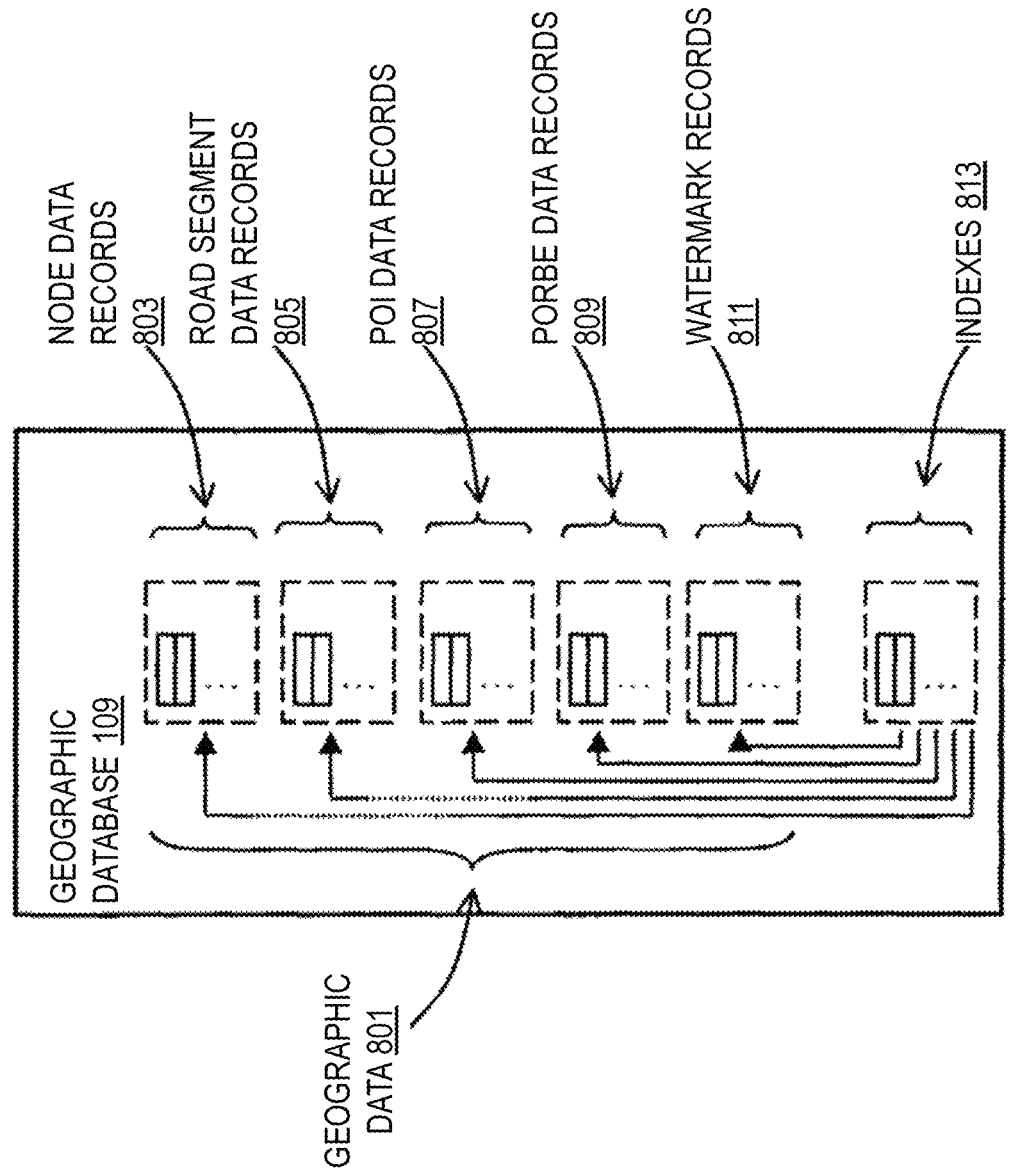
FIG. 8 is a diagram of a geographic database, according to one embodiment.

FIG. 8 is a diagram of a geographic database 109 capable of embedding information into probe data, according to one embodiment. In one embodiment, the geographic database 109 includes geographic data 801 used for (or configured to be compiled to be used for) mapping and/or navigation-related services, such as for embedding information into probe data. For example, the geographic database 801 stores probe data, watermark data, and model data (e.g., 2D map data, 3D object models, grid data, cube data, etc.) among other related data.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 801 of the database 109 includes node data records 803, road segment or link data records 805, POI data records 807, probe data records 809, watermark records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 109. In one embodiment, the indexes 813 may be used to quickly locate data without having to search every row in the geographic database 109 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. In addition, the geographic database 109 can contain path segment and node data records or other data that represent paths around map features (e.g., terrain features, buildings, other structures, etc.) that on and above street level, such as when routing or representing flightpaths of aerial vehicles (e.g., drones), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 807. The geographic database 109 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 109 can also include the probe data records 809 for embedding watermarks therein and processing the probe data sets to predict traffic data for the digital map data, and/or any other related data as described in the embodiments above. For example, mobile mapping vehicles equipped with LiDAR and/or equivalent sensors can provide probe data. In one embodiment, a digital map created from LiDAR, aerial/satellite-based 3D sensor data, and/or other 3D sensor data collected for a geographic area can store model data (e.g., 3D object models) of the digital map for facilitate embedding information into probe data. The digital map data can also be obtained with portable or smaller mapping devices/vehicles for mapping. In one embodiment, the probe data records 809 can be associated with one or more of the node records 803, road segment records 805, and/or POI data records 807 so that the probe data records 809 can inherit characteristics, properties, metadata, etc. of the associated records (e.g., location, address, POI type, etc.). In one embodiment, the system 100 (e.g., via the traffic platform 111 can use the additional characteristics, properties, metadata, etc. to generate delivery routes. In one embodiment, the probe data records 809 can include a data layer for storing real-time data on the digital map to support embedding information into probe data according to the embodiments described herein.

In one embodiment, the system 100 is capable of embedding information into probe data using probe data sets, the digital map data and/or real-time data stored in the geographic database 109. The resulting encoded probe data sets can be stored in the probe data records 809. By way of example, the encoded probe data sets stored in the probe data records 809 can be embedded with watermarks to prove ownership. In this way, previously generated encoded probe data sets can be reused in the future.

In one embodiment, the geographic database 109 can also include the watermark records 811 to be embedded in or extracted from probe data sets as described in the embodiments above. In one embodiment, the watermark records 811 can be associated with one or more owners of a probe data set. By way of example, the watermark data stored in the watermark records 811 can be specific to characteristics of the owner (e.g., owner profile, preferences, etc.) and/or other characteristics of the owner. In one embodiment, the watermark records 811 can be associated with one or more embedding schemes for an owner.

In one embodiment, the owner profile data includes, but not limited to, a name, login names, screen names, nicknames, handle names, addresses, email addresses, government identification numbers, operator license/credential types, digital identities, years in business, telephone numbers, financial data, activity records, employee records, insurance records, medical records, political and non-political affiliations, location preferences (e.g., POIs), calendar data, etc. of the owner.

In one embodiment, the geographic database 109 can be maintained by the services platform 117 and/or any of the services 119 of the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ aerial vehicles (e.g., using the embodiments of the privacy-control process described herein) or field vehicles (e.g., mapping aerial vehicles or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the aerial vehicle 101, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for embedding information into one probe data set may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
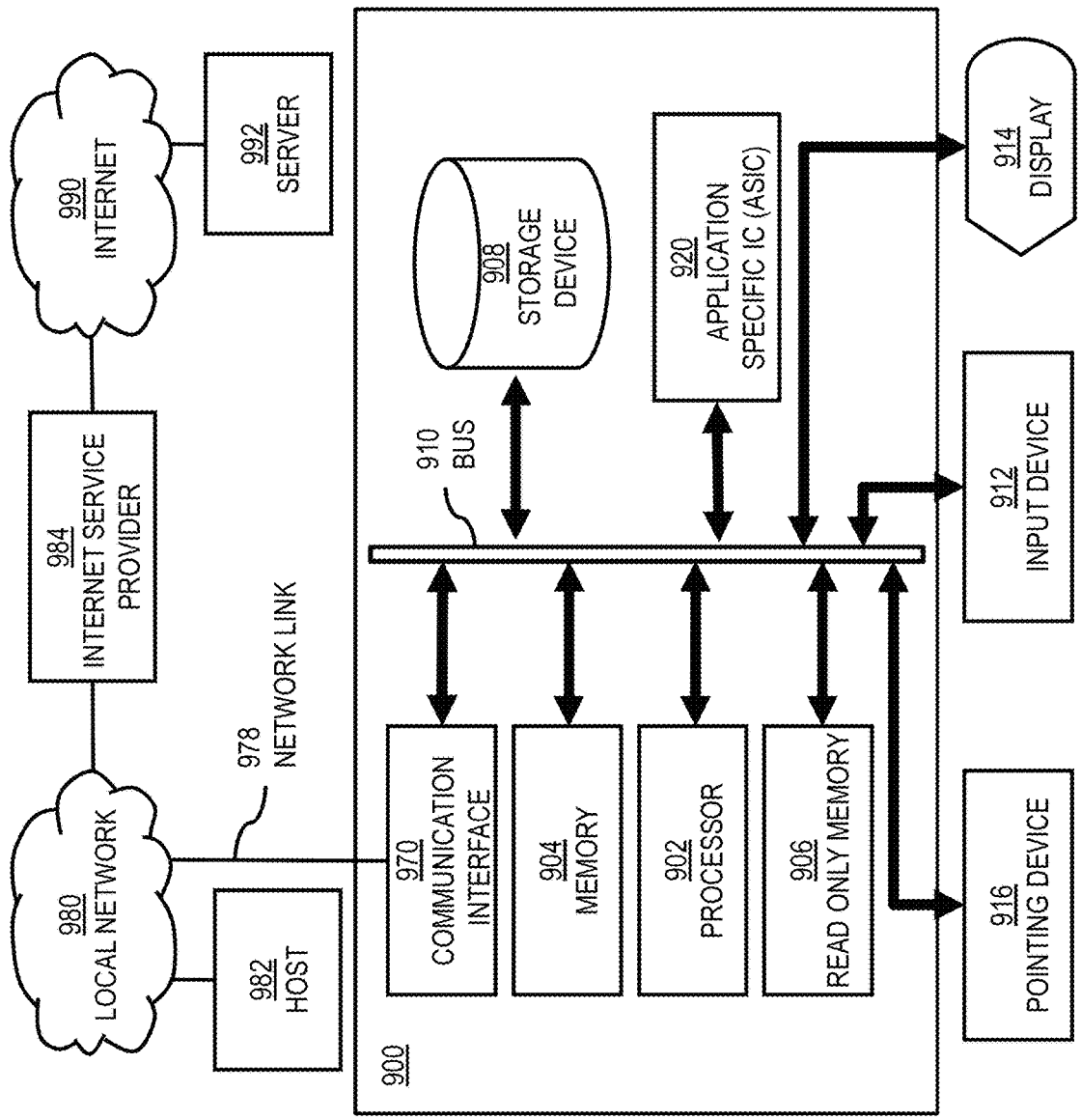
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to embed information into one probe data set as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to embedding information into one probe data set. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for embedding information into one probe data set. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for embedding information into one probe data set, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 115 for embedding information into one probe data set The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to embed information into one probe data set to be delivered to the user as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to embed information into one probe data set to be delivered to the user. The memory 1005 also stores the data associated with or generated by the execution of the inventive steps.

FIG. 11 is a diagram of exemplary components of a mobile terminal 1101 (e.g., client device such as the UE 123 or aerial vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to embed information into one probe data set to be delivered to the user. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for embedding information into probe data comprising:

retrieving a probe data set comprising a plurality of probe data points collected from a probe device;

determining the information to embed, wherein the information is a bit string of a specified length;

iteratively selecting, based on a repeating grid, at least one bit of the bit string to embed into at least one probe data point of the plurality of probe data points to generate an embedded probe data set until at least a predetermined portion of the bit string is embedded; and providing the embedded probe data set as an output.

2. The method of claim 1, wherein the information is a watermark.

3. The method of claim 1, wherein the generating of the embedded probe data set comprises:

quantizing latitude data and longitude data of the at least one probe data point into the repeating grid, wherein a grid cell index of the at least one probe data point in the repeating grid; and modulating the at least one bit into speed data of the at least one probe data point.

4. The method of claim 3, further comprising:

selecting a least significant bit of the speed data, wherein the at least one bit is modulated into the least significant bit.

5. The method of claim 3, wherein the modulating of the at least one bit into the speed data comprises:

setting a speed value of the speed data to an even integer or an odd integer based on a bit value of the at least one bit.

6. The method of claim 1, wherein the repeating grid has a grid size based on the specified length of the bit string and a cell edge size based on a specified unit measurement.

7. The method of claim 1, further comprising:

initiating an encryption of the information prior to embedding.

8. The method of claim 7, wherein the encryption uses a key based on a hash computed from an identity of the probe device, a random number, or a combination thereof.

9. The method of claim 8, wherein the key is used to prove an ownership of the probe data set.

10. The method of claim 1, further comprising:

generating another bit string based on the bit string by applying an error-correction block codec, wherein the another bit string is embedded into the probe data set in place of the bit string to generate the embedded probe data set.

11. An apparatus for extracting information from probe data comprising:

at least one processor; and at least one memory including computer program code for one or more programs, the at least one memory and the computer program code configured to, with the at least one processor, cause the apparatus to perform at least the following, receive a probe data set embedded with the information, wherein the probe data set comprises a plurality of probe data points collected from a probe device, and the information is a bit string of a specified length;

iteratively extract, based on a repeating grid, at least one bit of the bit string from at least one probe data point of the plurality of probe data points of the probe data set until at least a predetermined portion of the bit string is extracted; and identify an ownership of the probe data set based on the bit string.

12. The apparatus of claim 11, wherein the apparatus extracts the at least one bit of the bit string by:

quantizing latitude data and longitude data of the at least one probe data point into a grid cell index of the repeating grid;

using the grid cell index to select a position in the bit string for the at least one bit;

de-modulating speed data of the at least one probe data point into a bit value of the at least one bit; and reconstructing the bit string by setting the bit value of the at least one bit in the position in the bit string.

13. The apparatus of claim 12, wherein the apparatus is further caused to:

select a least significant bit of the speed data for the de-modulating.

14. The apparatus of claim 12, wherein the apparatus de-modulates the speed data into the at least one bit by:

converting an even integer or an odd integer of a speed value of the speed data as the bit value of the at least one bit.

15. The apparatus of claim 11, wherein the apparatus is further caused to:

initiate a decryption of the bit string.

16. The apparatus of claim 15, wherein the decryption uses a key and a hash computed from an identity of the probe device, a random number, or a combination thereof.

17. The apparatus of claim 11, wherein the apparatus is further caused to:

generate another bit string based on the bit string by removing an error-correction block codec, wherein the another bit string is applied with the error-correction block codec and then embedded into the probe data set.

18. A non-transitory computer-readable storage medium for embedding information, carrying one or more sequences of one or more instructions which, when executed by one or more processors, cause an apparatus to perform:

retrieving a data stream comprising a plurality of data points;

determining the information to embed, wherein the information is a bit string of a specified length;

iteratively selecting, based on a repeating grid, at least one bit of the bit string to embed into at least one data point of the plurality of data points to generate an embedded data stream until at least a predetermined portion of the bit string is embedded; and providing the embedded data stream as an output.

19. The non-transitory computer-readable storage medium of claim 18, wherein the data stream is collected from a probe device, and the embedded data stream is generated by:

quantizing at least two attributes of the at least one data point into the repeating grid, wherein a grid cell index of the at least one probe data point in the repeating grid; and modulating the at least one bit into a third attribute of the at least one data point, wherein the attributes include at least three of latitude, longitude, speed, timestamp, and direction.

20. The non-transitory computer-readable storage medium of claim 19, wherein the apparatus is further caused to perform:

selecting a least significant bit of the third attribute, wherein the at least one bit is modulated into the least significant bit.

* * * * *